United States Patent [19]
Ryan

[11] 3,979,497
[45] Sept. 7, 1976

[54] FILM EXTRUSION METHOD
[75] Inventor: Daniel J. Ryan, Chester, Pa.
[73] Assignee: FMC Corporation, Philadelphia, Pa.
[22] Filed: Jan. 14, 1974
[21] Appl. No.: 433,424

[52] U.S. Cl. ............................. 264/187; 264/188; 264/202
[51] Int. Cl.² ........................................ D01F 2/00
[58] Field of Search ............... 425/466; 264/177 R, 264/187, 202, 188

[56] References Cited
UNITED STATES PATENTS

| | | | |
|---|---|---|---|
| 2,923,971 | 2/1960 | Nelson | 425/466 |
| 2,982,995 | 5/1961 | Groleau | 425/466 |
| 3,694,132 | 9/1972 | Bunte et al. | 425/466 |
| 3,706,518 | 12/1972 | Bunte et al. | 425/466 |
| 3,797,987 | 3/1974 | Marion | 425/466 |

Primary Examiner—Jay H. Woo

[57] ABSTRACT

A method for making a film in which bead formation along opposite longitudinal edges thereof is at least minimized by extruding into a setting bath a generally flat stream of coagulable solution with the longitudinal edges of such stream each having a concave contour and being free to deform into a rounded contour under the influence of the interfacial surface tension forces acting upon the extruded stream of coagulable solution during the setting thereof.

8 Claims, 8 Drawing Figures

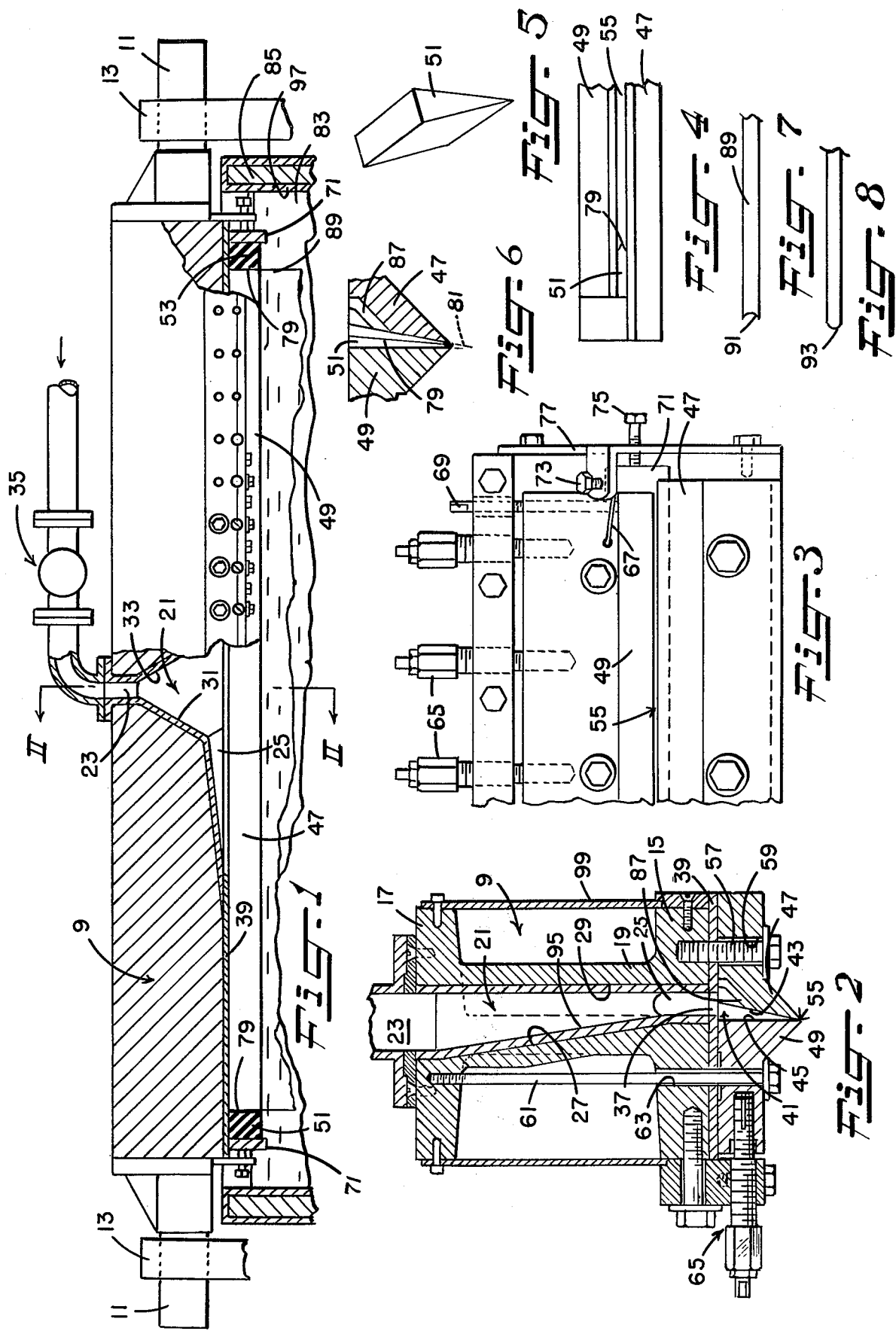

FILM EXTRUSION METHOD

The present invention is directed to a method for making thin, extruded, non-fibrous films and sheets, as for example, films of regenerated cellulose, cellulose esters and ethers, gelatin and casein, in which bead formation along the longitudinal edges thereof is at least minimized.

In the manufacture of films, for example, of regenerated cellulose, a coagulable solution, such as viscose, is extruded into a coagulating or setting bath through an elongated orifice formed by a pair of spaced, adjustable elongated blades, and end blocks which are engaged with the ends of the elongated blades. Regulation of the thickness of the film may be achieved by varying the width of the extrusion orifice, and/or by changing the pressure under which the viscose is extruded, and/or by altering the rate at which the extruded stream is pulled away from the extrusion orifice.

In the films produced by this conventional procedure the longitudinal edge areas thereof are substantially thicker than the remainder of the film and are of beaded or bulb-like configuration. The presence of such beaded edges often causes wrinkles, folds and creases to be imparted to the film during the winding thereof and, of course, considerable expense and waste is involved in the removal of such beaded edges to make a saleable product.

U.S. Pat. No. 2,712,155 discloses an extrusion nozzle having an adjustable blade which is formed with specially shaped kerfs which permit the end portions of such blade to be bowed. This nozzle construction provides some control over the thickness of those portions of the film which are adjacent to its longitudinal edges but, as shown in FIG. 5 of this patent, the resulting film still possesses beaded edges.

Similarly, U.S. Pat. Nos. 2,727,275 and 2,923,971 disclose extrusion nozzles having improved blade adjusting means but which, unfortunately, still produce films having beaded edges. Accordingly, a primary object of this invention is to provide a new or generally improved and more satisfactory method for making thin, extruded films and sheets.

Another object is the provision of an improved method for making films having little or no edge bead formation.

Still another object of this invention is the provision of an improved method for producing an extruded film having improved uniformity across its width by a partial reshaping of a stream of coagulable solution after the extrusion and during the setting thereof.

These and other objects and advantages of the invention are accomplished in accordance with the present invention by a method in which a concave contour is imparted to each of the longitudinal edges of a generally flat stream of a coagulable solution as such stream is extruded through an elongated orifice and issues into a setting bath. During entry into and passage through the setting bath, the contoured edges of the extruded stream of coagulable solution are allowed to freely reshape themselves into a generally rounded contour under the influence of the interfacial surface tension forces acting upon such stream before it is at least surface set. The coagulable solution is a cellulosic solution, and preferably viscose, which is extruded into a conventional sulphuric acid-sodium sulphate bath to provide a regenerated cellulose or cellophane film.

The concavity of the contour imparted to the edges of the extruded stream of coagulable solution is, desirably, sufficient to at least substantially completely accomodate the interfacial surface tension forces acting upon such extruded stream during the setting thereof so that the longitudinal edges of the resulting film are essentially beadless. Basically, this is achieved by extruding the coagulable solution through an elongated orifice having end walls which are curved convexly toward each other.

More specifically, the elongated orifice is defined by a pair of spaced, oppositely disposed blades, which are adjustable to vary the orifice width, and a pair of spaced inserts which are formed of resilient material and are engaged snugly between and compressed by the blades so that the opposing walls of such pair of inserts are distorted convexly toward each other. The opposing walls of the elongated blades extend in diverging relationship from the elongated orifice to together define a tapered feed passage and the inserts, in their relaxed or uncompressed condition, each have a cross-sectional configuration which corresponds generally with but is larger in size than that of such tapered feed passage so as to facilitate the desired distortion of the opposing walls thereof convexly toward each other during blade adjustment.

In the method of the present invention it is essential that the opposing, convexly curved walls of the inserts be properly wetted by the coagulable solution which is being extruded so as to at least minimize any tendency for the stream of coagulable solution to tear upon extrusion and/or to avoid sacrificing desirable film characteristics, as for example, film gauge properties.

More particularly, in the method of the present invention, as in conventional film extrusion procedures, the extruded steam of coagulable solution is usually pulled away from the extrusion orifice at a speed which is greater than the velocity at which such solution is extruded. Improved control over the gauge of the extruded stream and films having favorable properties are achieved with extrusion orifices which are of such widths as to provide for an increase in the ratio of the film speed to the extrusion velocity. However, in the absence of proper wetting of the insert walls, tearing of the extruded stream of coagulable solution, particularly during the initial film lacing stage, can be minimized only by a significant increase in the pressure applied to the solution being extruded. Increasing the extrusion pressures, of course, necessitates a reduction in the orifice width; that is, the spacing between the elongated blades, causing the extrusion velocity to increase and thus providing for an undesirable reduction in ratio of the film speed to the extrusion velocity.

Inserts suitable for use in the present invention are those formed of resilient materials with which the coagulable solution is non-reactive and makes a contact angle of from 0° to less than about 75° with, of course, the wetting characteristics being improved as the contact angles are reduced. When extruding viscose, the inserts are preferably formed of materials with which the viscose makes a contact angle of less than about 65°. The inserts may be made from a wide variety of resilient materials including, for example, natural rubber, silicone rubber, such as RTV and RTVA moldmaking silicone rubbers commercially available from the Dow Corning Company, chlorinated polyethylene, polyvinyl chloride, and polysulfide polymers, such as LP-3 polysulfide polymer sold by the Thiokol Chemical Corporation.

For a greater understanding of this invention, reference is made to the following detailed description and drawing in which FIG. 1 is a front view of the extrusion apparatus used in the method of the present invention disposed in its operative position within a setting bath, with portions of such apparatus being broken away;

FIG. 2 is a transverse vertical section taken along the line II—II of FIG. 1;

FIG. 3 is a bottom view of a portion of the structure shown in FIG. 1;

FIG. 4 is a diagrammatic bottom view of a portion of the structure shown in FIG. 1;

FIG. 5 is a perspective view of one insert employed in the apparatus shown in FIG. 1;

FIG. 6 is a diagrammatic view illustrating the installation of the insert of FIG. 5 between elongated orifice defining blades of the apparatus shown in FIG. 1;

FIG. 7 illustrates a cross-section of a portion of a shaped stream of coagulable solution as it issues from the apparatus shown in FIG. 1; and FIG. 8 is a cross-section of a portion of a film which results upon setting of a stream of coagulable solution having a shape as shown in FIG. 7.

With reference to FIGS. 1–3 of the drawing, the apparatus employed in the method of the present invention includes a nozzle body or main casting 9 having trunnions 11 projecting outwardly from its opposite ends and rotatably supported by bearings 13. The casting 9 is generally of I-shaped construction, having flanges 15 and 17 and web 19, and includes a central passage 21 having a circular opening 23 at one end and a longitudinally extending recess 25 at its opposite end. Between the opening 23 and the recess 25, opposing side walls 27 and 29 of the passage 21 extend in converging relationship, while end walls 31 and 33 thereof diverge from each other.

The opening 23 of the passage 21 is connected by conduit means 35 to a suitable source of coagulable solution, as for example viscose, while the recess 25 is aligned with a slot 37 formed in a bearing plate 39. The bearing plate slot 37, in turn, opens into a tapered feed passage 41 which is defined by opposing walls 43 and 45 of a pair of spaced, elongated blades 47 and 49 attached to the underside of the casting 9. A pair of spaced, wedge shaped inserts 51 and 53, which are hereafter described in greater detail, are interposed between the blades 47 and 49 and, together with such blade, define an extrusion orifice 55.

The blade 47 is secured to the casting flange 15 by a plurality of cap screws 57 which extend through slots 59 in the blade 47, pass through the bearing plate 39 and are threaded into the casting 9. The slots 59 facilitate limited blade movement, as may be desirable during preliminary, rough adjustment of the extrusion orifice 55. On the other hand, the blade 49 is fastened by elongated, flexible bolts 61 which extend through blade slots 63 and the bearing plate 39, and are threaded into the casting flange 17. Thus, the blade 47 is also capable of sliding movement relative to the bearing plate, as by adjusting screws 65, which correspond in both structure and operation to the adjusting screws described in U.S. Pat. No. 2,727,276.

The inserts 51 and 53 are formed of resilient material with which the coagulable solution makes a contact angle of from 0° to less than 75°, including such materials as natural rubber, mold-making silicone rubbers, chlorinated polyethylene, polyvinyl chloride and polysulfide polymers. These inserts 51 and 53 may be of hollow or solid construction and are preferably of like configuration, with each being of wedge shape, as shown in FIG. 5, and having a cross-section which is larger than but generally conforming with that of the feed passage 41.

As in known film extrusion apparatus, the blade 49 may be formed with kerfs 67 which permit the blade end portions to be bowed by adjusting screws 69, as illustrated and described in U.S. Pat. No. 2,712,155. Similarly, in a manner as disclosed in U.S. Pat. Nos. 2,727,275 and 2,923,971, end blocks 71 are maintained engaged with the extremities of the blades 47 and 49 by screws 73 and 75 threaded into brackets 77 which are fixed to the casting 9. The end blocks 71 minimize leakage, while yet permitting adjustment of the blade 49, and help to contain the inserts 51 and 53 as hereafter described.

In a manner as shown in FIG. 6, the inserts 51 and 53 are simply positioned between the blades 47 and 49, in spaced apart relationship and abutting against the adjacent end blocks 71, before such blades are adjusted to provide an orifice 55 of desired width. The blades 47 and 49 are then adjusted to provide an orifice of desired working dimension, whereby the opposing walls 79 of the pair of inserts 51 and 53 are caused to bulge or curve convexly toward each other, as shown in FIG. 4.

Deformation of the inserts 51 and 53 during blade adjustment is, for the most part, confined to the opposing walls 79, with the bearing plate 39, end blocks 71 and, of course, the blades 47 and 49 restricting or preventing distortion along other walls thereof. After the adjustment of the blades has been completed, the portions 81 of the inserts projecting beyond the blades, as indicated by dotted lines in FIG. 6, is cut away.

The described apparatus is adapted to be rotated relative to the bearings 13 and, when in its operative position shown in FIG. 1, the blades 47 and 49 extend into a coagulating or setting bath 83 contained within a tank 85. In such position, a coagulable solution is continuously delivered under pressure into and through the passage 21, enters the feed passage 41, with portions of such solution being channeled toward the ends of such passage 41 by a distributing trough 87 milled into the blade 47, and flows as a shaped stream 89 through the extrusion orifice 55 and into the setting bath. This shaped stream 89 is set into a film within and during passage through the bath 83, with the resulting film being advanced and take up at a speed greater than the velocity at which the coagulating solution is extruded.

With the apparatus described above, the opposing convexly curved walls 79 of the spaced inserts 51 and 53 impart a concave or fish-tail contour to opposite ends of the stream of coagulable solution, as indicated at 91 in FIG. 7, during its passage relative thereto. Upon issuance from the orifice 55 and into the setting bath 83, extruded shaped stream 89 responds freely to the interfacial surface tension forces acting thereon with its respective longitudinal edges, in effect, being reshaped from its initial concave or fish-tail contour 91 to one which is rounded and having a minimum or no bead, as shown at 93 in FIG. 8.

The degree of concavity 91 imparted to the longitudinal edges of the extruded stream of coagulable solution will vary with such factors as the interfacial surface tension forces acting upon the particular material being extruded and the rate at which the extruded stream is set, but should be such as to at least accommodate those surface tension forces which are active on the extruded stream 89 as it assumes at least a surface set. Of course the greater the concavity 91 imparted to the longitudinal edges of the extruded stream of coagulable solution, the less pronounced will be the rounded edge 93 of the resulting film and in no instance can excess concavity 91 be imparted to such shaped stream.

The concavity of the contour 91 imparted to the extruded stream 89 is, of course, determined by the convex curvature of the opposing insert walls 79 which, in turn, is determined by the original size of the inserts 51 and 53 relative to the feed passage 41, and the extent to which they are compressed during blade adjustment. Thus, the inserts 51 and 53 must be of such size as to undergo at least some deformation along the opposing walls 79 thereof.

When necessary, the passage 21 and the tank 85 may be lined with suitable corrosion-resistant materials as indicated at 95 and 97, respectively. In addition splash covers 99 may be applied to the casting 9 to protect the same.

In the use of the above-described apparatus in the extrusion of viscose, a pair of inserts 51 and 53, formed of RTV silicone mold-making rubber, supplied by the Dow Corning Company, were snugly seated between blades spaced to provide an initial orifice width of about 0.014 inch. Upon adjusting such blades to a desired working orifice width of about 0.007 inch, the opposing walls of the pair of inserts were convexly curved toward each other sufficiently to impart such concavity to the longitudinal edges of the extruded viscose stream that the resulting film exhibited substantially no beads.

It is to be understood that changes and variations may be made without departing from the spirit and scope of the invention as defined in the appended claims.

I claim:

1. A method for making a film in which beam formation along opposite longitudinal edges thereof is at least minimized including the steps of extruding a generally flat stream of coagulable solution through an elongated orifice and into a setting bath within which bath the extruded stream is coagulated into a film, imparting a concave contour along each of the opposite longitudinal edges of the stream of coagulable solution immediately prior to and during its passage through the elongated orifice, during the coagulation thereof advancing the extruded stream through the setting bath at a speed which is greater than the velocity at which the coagulable solution is extruded through the elongated orifice, and allowing the contoured edges of the extruded stream to freely reshape themselves into a generally rounded contour under the influence of interfacial surface tension forces acting upon such stream coagulable solution as it enters into and passes through the setting bath.

2. A method as defined in claim 1 wherein the concavity of the contour imparted to the edges of the extruded stream of coagulable solution is sufficient to at least substantially completely accommodate the interfacial surface tension forces acting upon such extruded stream during the setting thereof.

3. A method as defined in claim 1 wherein said coagulable solution is a cellulosic solution.

4. A method as defined in claim 1 wherein the coagulable solution is viscose.

5. A method as defined in claim 1 wherein the coagulable solution is extruded through an elongated orifice defined by walls, including end walls, which are curved convexly toward each other.

6. A method as defined in claim 1 wherein said elongated orifice is defined by a pair of spaced, oppositely disposed blades and a pair of spaced inserts formed of resilient material which are engaged snugly between and compressed by the blades so that opposing walls of the pair of inserts are distorted convexly toward each other.

7. A method as defined in claim 6 wherein the inserts are formed of a resilient material with which the coagulable solution makes a contact angle of from 0° to less than about 75°.

8. A method as defined in claim 7 wherein the inserts are formed of a resilient material selected from the group consisting of natural rubber, silicone mold-making rubber, chlorinated polyethylene, polyvinyl chloride and polysulfide polymers.

* * * * *